United States Patent [19]
Castoe

[11] 3,811,654
[45] May 21, 1974

[54] CAMBER AND CASTER ADJUSTMENT TOOL

[75] Inventor: John H. Castoe, Los Angeles, Calif.

[73] Assignee: Branick Manufacturing Company, Fargo, N. Dak.

[22] Filed: Dec. 7, 1972

[21] Appl. No.: 313,089

[52] U.S. Cl. .............................................. 254/131
[51] Int. Cl. ............................................... B66f 3/00
[58] Field of Search ...... 254/131; 29/271, 267, 270, 29/278; 81/3 R

[56] References Cited
UNITED STATES PATENTS
3,537,685  11/1970  Gregory ............................. 254/131

Primary Examiner—Al Lawrence Smith
Assistant Examiner—Robert C. Watson
Attorney, Agent, or Firm—Petherbridge, Lindgren & Gilhooly

[57] ABSTRACT

A vehicle camber and caster adjustment tool including a hook member for engaging the inner shaft of a wheel assembly to be adjusted wherein the hook member is pivotally mounted to a force transmitting element which is adapted to be retained on the frame of the vehicle. The force transmitting element further includes an upper socket wrench receiving projection which permits manual force to be applied to the hook by rotation of the force transmitting element in an appropriate direction. The novel design of the tool of the invention achieves a significant application of force to the shaft supporting the wheel assembly because of the offset position of the hook with respect to the force transmitting element.

8 Claims, 5 Drawing Figures

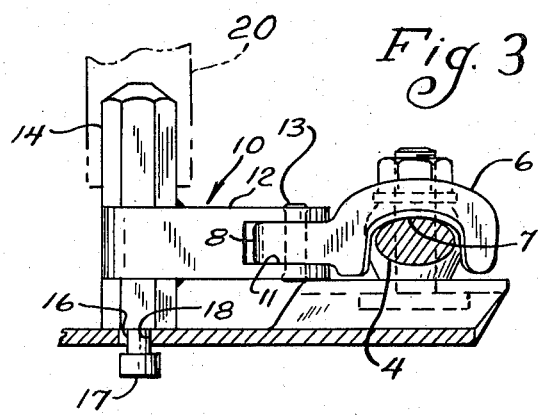
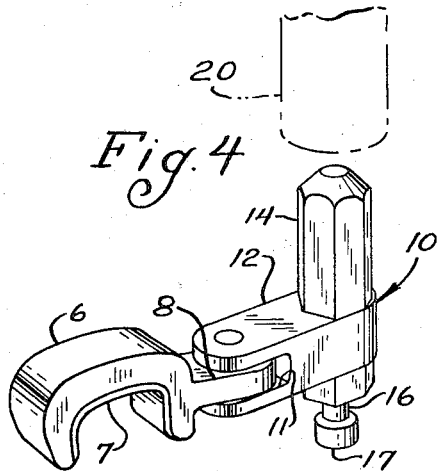
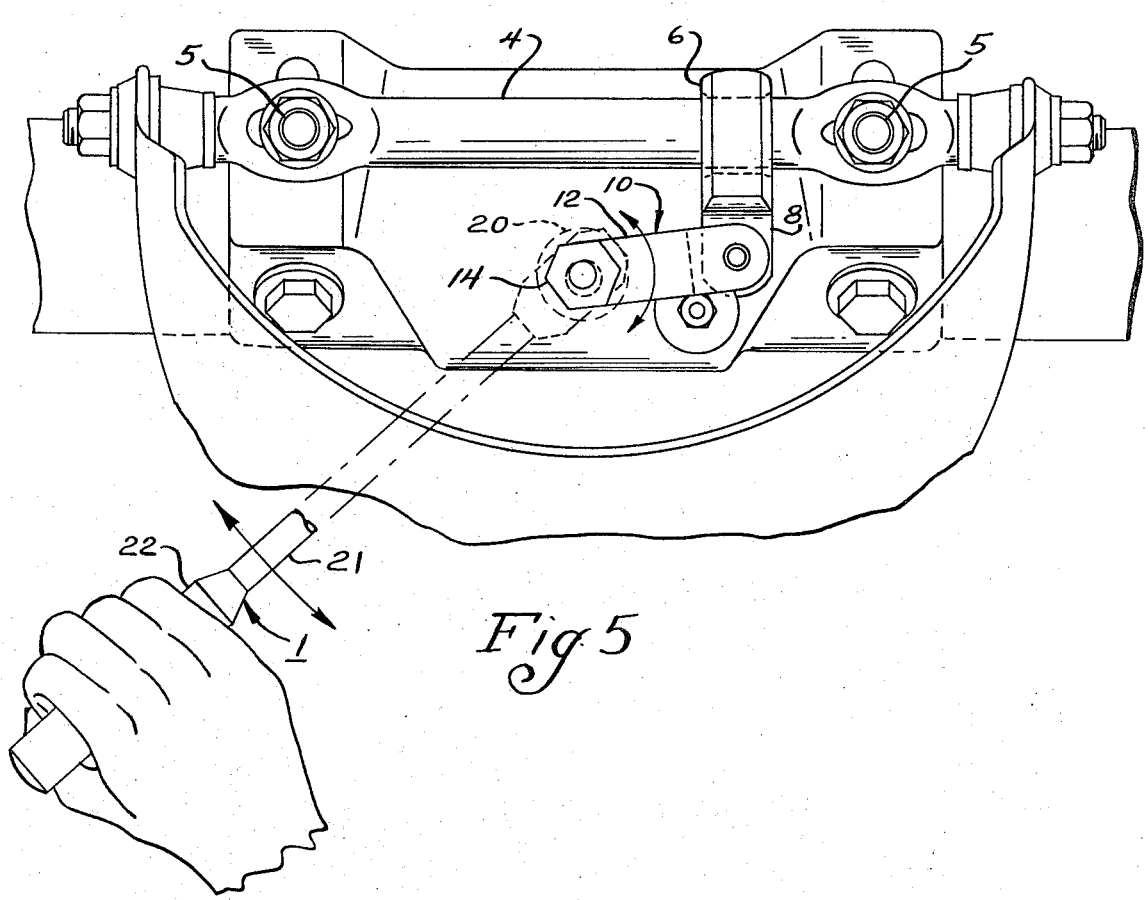

CAMBER AND CASTER ADJUSTMENT TOOL

BACKGROUND OF THE INVENTION

This invention relates in general to an adjustment tool and in particular, to a novel camber and caster adjustment tool.

More specifically, this invention relates to a camber and caster adjustment tool for use in vehicles to perform desired camber and caster adjustments of the wheels. The tool disclosed herein possesses a novel design which permits desired adjustment of a wheel even when access to the adjusting elements of the vehicle is relatively difficult.

During normal operation of automobiles and the like, it is necessary to adjust periodically the wheel of the vehicle for both camber and caster. A caster adjustment of the wheel refers to the adjustment of the wheel with respect to its forward or rearward tilt on the top of the wheel spindle. On the other hand, camber is considered to be the amount that the front wheels are tilted at the top. It has been found that in certain new automobiles, particularly vehicles manufactured by Chrysler Corporation, it is difficult to adjust the camber and caster of the front wheels because the design of the wheel assembly and the vehicle body is not compatible with tools conventionally utilized in the past to make such adjustments.

To overcome the problem of adjustment of these new vehicles, the body of the automobile has been provided with a window having a removable cover to allow access to the wheel assembly from beneath the hood. However, the vehicle possesses certain mechanisms under the hood such as the window washer bottle and the like which must be removed in order to remove the plate for access to the wheel assembly for adjustment thereof. Such removal of elements in front of the plate as well as removal of the plate itself does not permit rapid and efficient adjusting of the wheel. Moreover, the tools currently available to perform camber and caster corrections through the window in the body of the vehicle are not effective in achieving necessary corrections of the wheel.

The tools currently available to adjust the wheel from underneath the fender have been inefficient in performing camber and caster adjustments. Not only are the tools difficult to position and manipulate adjacent the wheel assembly, but do not apply adequate amounts of force to cause corrective movement of the inner shaft of the wheel assembly for adjustment purposes. Further, because of the design of the tools heretofore used in such vehicles, it is found in practice that tools often break during the adjustment procedure and are unsatisfactory for making camber and caster adjustments of the new models of vehicles having the particular design heretofore discussed.

SUMMARY OF THE INVENTION

It is, therefore, an object of this invention to improve the adjustment of a wheel assembly of a wheel.

Another object of this invention is to improve the tool utilized in effecting caster and camber adjustment of a wheel of a vehicle.

A further object of this invention is to reduce the cost and complexity of the tool utilized to making camber and caster adjustments.

Still another object of this invention is to perform camber and caster adjustment on a vehicle from a position which is readily accessible by a mechanic.

These and other objects are attained in accordance with the present invention wherein there is provided a camber and caster adjustment tool for contacting an end of the inner shaft of a wheel assembly for adjustment thereof. The tool includes a hook member for contacting the wheel assembly and is pivotally mounted to a force transmitting element that is retained in a hole in the chassis of a vehicle. The force transmitting element is retained on the body of the vehicle at a point near the midportion of the wheel assembly in an offset position from the hook member which is attached to either end of the shaft. Such an offset application of force to the hook means provides improved and more efficient movement of the shaft to adjust camber and caster.

Force is applied to the force transmitting device by manual manipulation of a removable socket wrench having a handle member which conveniently extends beyond the wheel assembly for effective manipulation of the tool. Moreover, the novel design of the tool permits the device also to be utilized through the removed panel of the body for vehicles having such a feature and thus the device can be used from beneath the hood, if desired. The tool of the invention disclosed overcomes the breakage problem and difficulty of use the tools heretofore utilized to adjust the inner shaft of certain models of vehicles currently manufactured.

DESCRIPTION OF THE DRAWINGS

Further objects of the invention, together with additional features contributing thereto and advantages accruing therefrom, will be apparent from the following description of an embodiment of the invention when read in conjunction with the accompanying drawings, wherein:

FIG. 3 is an end schematic illustration of the tool of the invention taken along line 3 — 3 of FIG. 2;

FIG. 4 is a side enlarged perspective illustration of the hook and force transmitting means of the tool of the invention; and FIG. 5 is a top schematic illustration of the tool in operative position for adjustment of the wheel assembly at the opposite end of the inner shaft than is illustrated in FIG. 1.

DESCRIPTION OF THE PREFERRED EMBODIMENT

Figure 1:
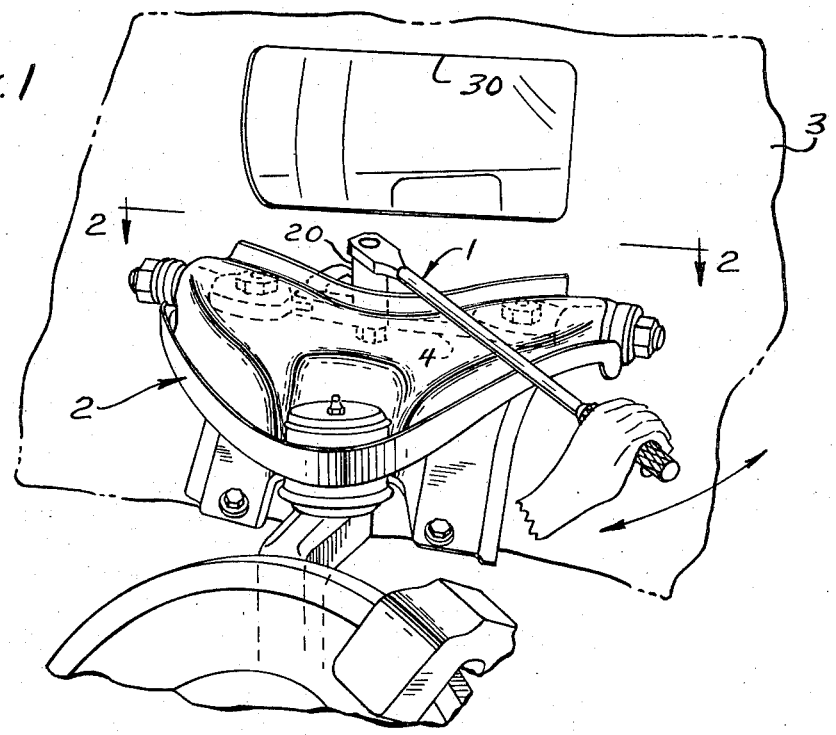
FIG. 1 is a perspective illustration of the camber and caster tool of the invention in operative adjusting position with respect to the front wheel assembly of a vehicle.

Referring now to FIGS. 1, 2, 3 and 5 there is illustrated an embodiment of camber and caster adjustment tool 1 of the invention in operative position adjacent a wheel assembly 2 which is attached to the chassis 3 of a vehicle. The wheel assembly is provided with an upper inner shaft 4 which is generally attached to the vehicle body by means of a pair of nut and bolt assemblies 5 affixing shaft 4 and wheel assembly 2 to the frame. Referring to FIGS. 2 to 5 camber and caster adjustment tool 1 of the invention is best shown. Adjustment tool 1 includes a hook member 6 having a hook portion 7 which is adapted to contact and embrace the upper surface of the shaft of the wheel assembly. The hook member possesses a projection 8 which is coupled for pivotal movement to a force transmitting element 10.

Projection 8 is pivotally mounted to the force transmitting element in a slot 11 formed in a lateral arm 12 of element 10 wherein a pin 13 retains the hook member to arm 12. Lateral arm 13 of the force transmitting element is integrally connected to an upright shaft 14 of the force transmitting element which can assume various cross-sectional configurations such as hexagonal as shown in FIG. 4. Arm 12 is positioned on shaft 14 at distance from the bottom thereof to the bottom of the projection which equals the approximate vertical positioning of the hook member 6 on shaft 4 when the tool is positioned for adjustment. The bottom of shaft 14 of force transmitting element 10 is provided with a projection 16 having an enlarged end 17 wherein the enlarged portion 17 acts to maintain the projection in a hole 18 conventionally provided in the vehicle frame and retain the tool during use.

The upper portion of shaft 17 which extends above arm 13 acts to receive a socket wrench 20 having an inner configuration complimentary to the exterior configuration of shaft 14. The socket wrench possess a vertical portion 21 wherein an elongated handle 22 extending perpendicular thereto is coupled to the portion 21. The end of handle 22 includes a grasping portion 23 which may be manipulated by hand at a position away from the wheel assembly.

In use of the tool for adjusting the camber and caster of a wheel assembly, the tool is positioned in the space between the front wheel of a vehicle and the inner shaft whereby projection 16 is inserted into hole 18 provided in the vehicle body. At the same time projection 16 is inserted in hole 18, hook 6 is brought down in position over a selected end of shaft 4 as shown in either FIGS. 2 and 5. The socket wrench 20 may then be placed over the upper portion of shaft 14 or alternatively socket wrench 20 may have been interfitted with the shaft prior to the tool being positioned. Thereafter, the handle may be grasped manually and force supplied to shaft 4 of the wheel assembly by rotating the force transmitting element in a desired direction to effect adjustment. During the adjustment operation, bolt 5 of the inner shaft is loosened for that end of the wheel assembly which requires adjustment and the tension is released on the other bolt. Thereafter, the force is applied to the shaft until the desired camber and caster adjustment is performed.

Figure 2:
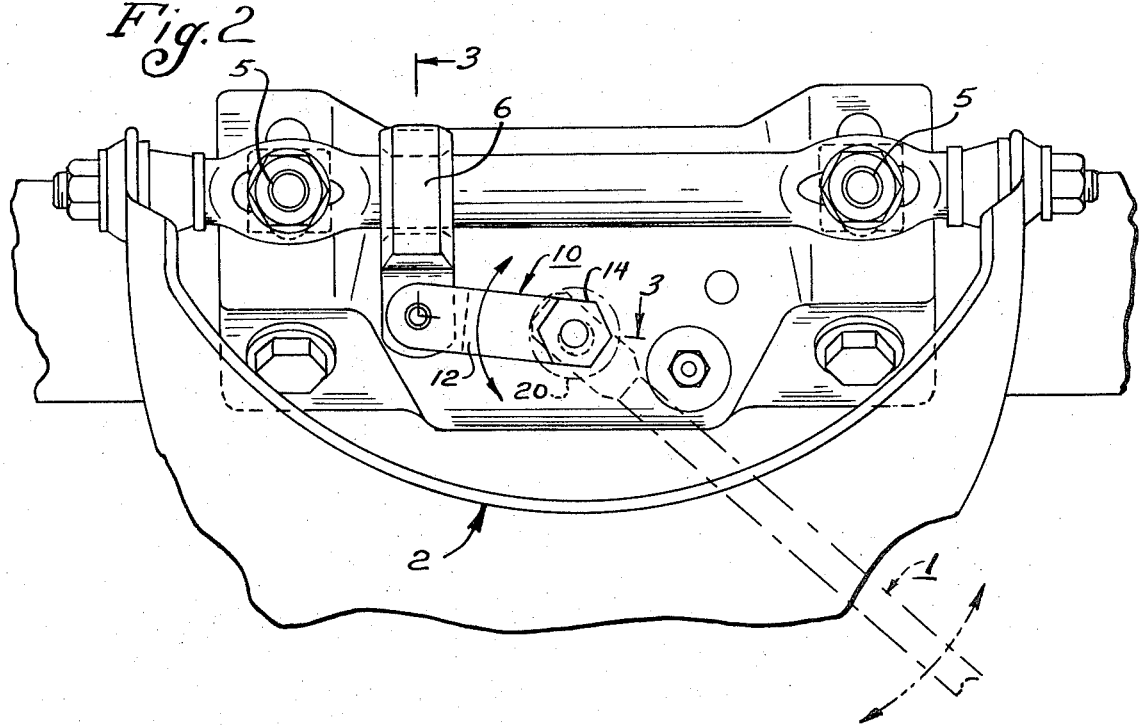
FIG. 2 is a top schematic illustration of the tool of the invention in operative position adjacent one end of the inner shaft of the wheel assembly being adjusted taken along line 2—2 of FIG. 1.

A similar operation can be effected on the other end of the shaft as shown in both FIGS. 2 and 5. After the desired adjustment of the wheel has been accomplished, the tool is removed after the bolts have been tightened in an adjusted position of the shaft. From the foregoing it should be apparent that the offset design of the tool wherein projection 17 affixes the tool to the vehicle body at a point offset from the position of the hook member achieves considerable leverage on the shaft to accomplish easy movement thereof during adjustment. The tool of the invention is also capable of being utilized through opening or window 30 shown in FIG. 1 from beneath the hood if desired.

While the invention has been described in reference to a preferred embodiment, it will be understood by those skilled in the art that various changes may be made and equivalents may be substituted for elements thereof without departing from the true spirit and scope of the invention, and, in addition, many modifications may be made to adapt to a particular situation material to the teachings of the invention without departing from its essential teaching.

What is claimed is:

1. A camber and caster adjustment tool for making camber and caster adjustments of a wheel assembly of a vehicle, comprising
    an elongated shaft means adapted to be rotated about the longitudinal axis of the shaft means,
    said shaft means including retention means to retain an end against a vehicle frame and to permit rotational movement of the shaft relative to said vehicle frame,
    a projection means extending from said shaft means and being pivotally mounted on said shaft along an axis substantially parallel to said longitudinal axis, and
    said projection means including an end portion to contact the wheel assembly of the vehicle to apply a force thereto in response to rotation of the shaft means.

2. The tool of claim 1 wherein said projection means is pivotally connected in a slot provided in said shaft means.

3. The tool of claim 1 wherein said end portion comprises a hook member for embracing the inner shaft of a wheel assembly to be adjusted.

4. The tool of claim 1 wherein said retention means comprises a projection adapted to be inserted in a hole in the vehicle.

5. The tool of claim 1 wherein said shaft means includes a fitting adapted to receive a removable force applying element.

6. The tool of claim 5 further comprising a force applying means attachable to the fitting to apply rotatable force and including an elongated handle for manual manipulation thereof.

7. The tool of claim 3 wherein said hook member is adapted to be placed over the upper portion of the inner shaft of a wheel assembly.

8. The tool of claim 1 wherein said end portion contacts the wheel assembly at a point off-set from the position the shaft means is retained on the vehicle.

* * * * *